(12) United States Patent
Lewis

(10) Patent No.: US 8,014,380 B2
(45) Date of Patent: Sep. 6, 2011

(54) METHOD AND SYSTEM FOR AUTOMATICALLY ESTABLISHING A RETURN LABEL SWITCHED PATH

(75) Inventor: Haydn Marc Lewis, Veradale, WA (US)

(73) Assignee: Alcatel Lucent, Paris (FR)

( * ) Notice: Subject to any disclaimer, the term of this patent is extended or adjusted under 35 U.S.C. 154(b) by 1222 days.

(21) Appl. No.: 10/392,141

(22) Filed: Mar. 18, 2003

(65) Prior Publication Data

US 2004/0004955 A1    Jan. 8, 2004

Related U.S. Application Data

(60) Provisional application No. 60/394,052, filed on Jul. 3, 2002.

(51) Int. Cl.
   *H04L 12/28* (2006.01)
(52) U.S. Cl. ................ 370/351; 370/389; 370/401
(58) Field of Classification Search .......... 370/351, 370/389, 400, 401, 468, 328, 335, 349, 469; 709/240, 242, 243
   See application file for complete search history.

(56) References Cited

U.S. PATENT DOCUMENTS

| | | | |
|---|---|---|---|
| 5,852,630 A * | 12/1998 | Langberg et al. | 375/219 |
| 6,341,127 B1 * | 1/2002 | Katsube et al. | 370/352 |
| 6,721,269 B2 * | 4/2004 | Cao et al. | 370/227 |
| 6,882,643 B1 * | 4/2005 | Mauger et al. | 370/389 |
| 6,886,043 B1 * | 4/2005 | Mauger et al. | 709/238 |
| 6,895,008 B2 * | 5/2005 | Enoki et al. | 370/392 |
| 6,985,488 B2 * | 1/2006 | Pan et al. | 370/395.3 |
| 7,035,226 B2 * | 4/2006 | Enoki et al. | 370/254 |
| 7,126,907 B2 * | 10/2006 | Carpini et al. | 370/218 |
| 7,136,354 B2 * | 11/2006 | Fujita | 370/232 |
| 7,170,869 B2 * | 1/2007 | Yang et al. | 370/328 |
| 7,212,495 B2 * | 5/2007 | Karri et al. | 370/238 |
| 7,483,399 B2 * | 1/2009 | Zelig et al. | 370/258 |
| 2003/0137971 A1 * | 7/2003 | Gibson et al. | 370/351 |

FOREIGN PATENT DOCUMENTS

WO    WO 01 95583 A    12/2001

OTHER PUBLICATIONS

Awduche et al, "RSVP-TE: Extensions to RSVP for LSP Tunnels", Dec. 2001, IETF, RFC 3209, p. 1-60.*

(Continued)

*Primary Examiner* — Dang T Ton
*Assistant Examiner* — Brian O'Connor
(74) *Attorney, Agent, or Firm* — Galasso & Assoc. L.P.

(57) ABSTRACT

A method and apparatus for unilaterally forming a bi-directional label switched path between first and second routing devices in a network is disclosed. The method of the preferred embodiment is comprised of the steps of: sending a first LSP path message comprising a first bi-directional indicator from the first routing device to the second routing device; and automatically sending a second LSP path message from the second routing device to the first routing device in response to the first bi-directional indicator. The resulting two unidirectional label switched paths may be associated with one another at the endpoints to form a bi-directional LSP. The bi-directional indicator is preferably an RSVP protocol opaque object used in part to specify the router resources required for the return LSP, which may be different than the resource requirements of the forward LSP specified in the first LSP path message.

28 Claims, 5 Drawing Sheets

OTHER PUBLICATIONS

Sanchez-Lopez et al, "A Path Establishment Approach in an MPLS-ATM Integrated Environment", Nov. 25-29, 2001, IEEE Globecom '01, p. 2767-2681.*

Banerjee et al, "Generalized Multiprotocol Label Switching: An Overview of Signaling Enhancements and Recovery Techniques", Jul. 2001, IEEE Communications Magazine, p. 144-151.*

Rosen et al, "Multiprotocol Label Switching Architecture", Jan. 2001, IETF, RFC 3031, p. 1-60.*

Le Faucheur, Francois, "IETF Multiprotocol Label Switching (MPLS) Architecture," IEEE International Conference on ATM, ICATM '98, Conference Proceedings, Colmar, France, Jun. 22-24, 1998, p. 6-15, IEEE International Conference on ATM, New York, NY.

Awduche, D., Berg, L., Srinivas, V. and Swall, G., "RFC 3209:Extensions to RSVP fo LSP Tunnels," Network Routing Group, Dec. 2001, p. 5, 16-37, Retrieved from the Internet: <URL: HTTP://www.IETF.org/rfc/rfc3209.txt>, Retrieved on Oct. 8, 2003.

'The MPLS FAQ—p. 2 of 3.' The MPLS Resource Center, [online],[retrieved on Mar. 17, 2003]. Retrieved using Internet URL:<http://www.mplsrc.com/faq2.shtml#MPLS%20Components>.

* cited by examiner

METHOD AND SYSTEM FOR AUTOMATICALLY ESTABLISHING A RETURN LABEL SWITCHED PATH

CROSS-REFERENCE TO RELATED APPLICATION

This application claims the benefit of U.S. provisional application No. 60/394,052, filed Jul. 3, 2002, the contents of which is hereby incorporated herein by reference for all purposes.

FIELD OF INVENTION

The invention relates to the Multiprotocol Label Switching (MPLS) protocol used to establish label switched paths between endpoints in a network. In particular, the invention relates to an improved method and system of forming pairs of unidirectional label switched paths between endpoints.

BACKGROUND

An MPLS Label Switched Path (LSP) is a uni-directional "tunnel" originating at one label edge router (LER), passing through zero or more transit label switch routers (LSRs), and terminating at an egress LER. The tunnel may be thought of as a "virtual circuit" connecting one LER to another LER via an OSI layer 2 physical connection. To set up an LSP, an Internet Protocol (IP) signaling protocol such as a Resource ReSerVation Protocol (RSVP) or Label Distribution Protocol (LDP) is commonly used.

LSPs are generally set up by issuing a request on an ingress LER via a command line interface (CLI) command or network management tool running somewhere in the network which sends commands to the ingress LER to create the LSP. The LSP can be configured to take a specific, non-specific or normal IP routing path through the network to reach the egress LER. It can also be configured optionally to provide specific bandwidth or quality-of-service (QoS) characteristics such as low-latency (i.e., minimally senescent packets), low-jitter and/or priority. LSPs provide an increasingly popular way to create virtual circuits needed to seamlessly connect geographically distributed users with high bandwidth, low jitter, virtual circuitry.

LSP tunnels are more useful if made to appear to be bi-directional such that traffic can flow in both directions between the endpoints. To create a bi-directional virtual circuit, two LSPs must be established—one in each direction originating at the two endpoints. This kind of tunnel causes additional administrative difficulty in that two separate LSPs have to be setup. Furthermore, it is desirable to have the two parts of the bi-directional virtual circuit pass along the same physical path so that the chance of communication interruption is minimal. This requirement adds to the burden of the administrator(s) charged with setting up the LSPs since the first leg of the bi-directional LSP, a uni-directional LSP, may take a particular path which is not known until the LSP is fully set up. The second leg of the bi-directional LSP, that is the complementary uni-directional LSP originating at the egress LER of the first LSP and terminating at the ingress LER of the first LSP, ideally needs to follow the same path and must therefore be explicitly specified.

This kind of return LSP can be established manually; that is, with human intervention and judgment. Some of the required information is only available at the egress LER of the forward LSP, thus time may also be required to obtain the required information from the possibly remote physical location. What is needed therefore is a procedure to automatically establish a return LSP that traverses the same path between two endpoints as a forward LSP.

SUMMARY

The problems experienced in constructing bi-directional label switched paths are overcome by the present invention, in its several embodiments including a method and an apparatus for automatically establishing a complementary label switched path. The method of forming a bi-directional LSP between a first and second routing device is comprised of the steps of: sending a first LSP setup request message comprising a first bi-directional indicator from the first routing device to the second routing device; and automatically sending a second LSP setup request message from the second routing device to the first routing device in response to the first bi-direction indicator; wherein a first unidirectional LSP is established in a message exchange initiated by the first LSP setup request message, and a second unidirectional label switched path is established in a message exchange initiated by the second LSP setup request message.

In some embodiments, the first and second LSP setup request messages are first and second RSVP PATH messages, respectively, used to request resources from the endpoint routers and the transit routers. The first and second RSVP PATH messages preferably invoke first and second RSVP RESV messages, respectively, that consummate the reservation of the resources at the various routers and established the label convention used by data that is subsequently transmitted from the endpoint routers.

In some embodiments, the first and second LSP setup request messages include opaque objects that signal the formation of the bi-directional LSPs between endpoints. The first LSP setup request message preferably includes a first bi-direction indicator that uniquely identifies the LSP and specifies the resource requirements of the return LSP. The second LSP setup request message is automatically generated at the receiving LER in response to the first bi-direction indicator. The second LSP setup request message preferably includes a second bi-directional indicator that indicates to the original LER that the second of the two unidirectional LSPs may be associated at the endpoints once the return LSP is created. In the preferred embodiment, the first and second LSP setup request messages are RSVP PATH messages that are followed by RSVP RESV messages.

In the preferred embodiment, the return LSP propagates over the same route as the forward LSP to reduce the chance of the connection failing. The path traced by the second LSP setup request message may be determined from a record route object in the first LSP setup request message, or from an explicit route object defined by the network administrator.

Upon establishment of a unidirectional LSP or the bi-directional LSP, one or more pseudo wires may be established therein. The pseudo wires may be formed using a protocol such as LDP.

The system for establishing a bi-directional label switched path between endpoints comprises: a first routing device for sending a first LSP setup request message comprising a first bi-direction indicator from the first routing device; and a second routing device for automatically sending a second LSP setup request message from the second routing device to the first routing device upon receipt of the first LSP setup request message; wherein a first and a second unidirectional LSP between the first routing device and the second routing device are established in first and second message exchanges, respectively, initiated by the first and second LSP setup request messages, respectively; whereby label encapsulated data may be transmitted between the first routing device and the second routing device in either direction. As described above, the first and second LSP setup request messages are preferably RSVP PATH messages, the second of which is automatically generated in response to an opaque object in the first.

DETAILED DESCRIPTION

Figure 1:
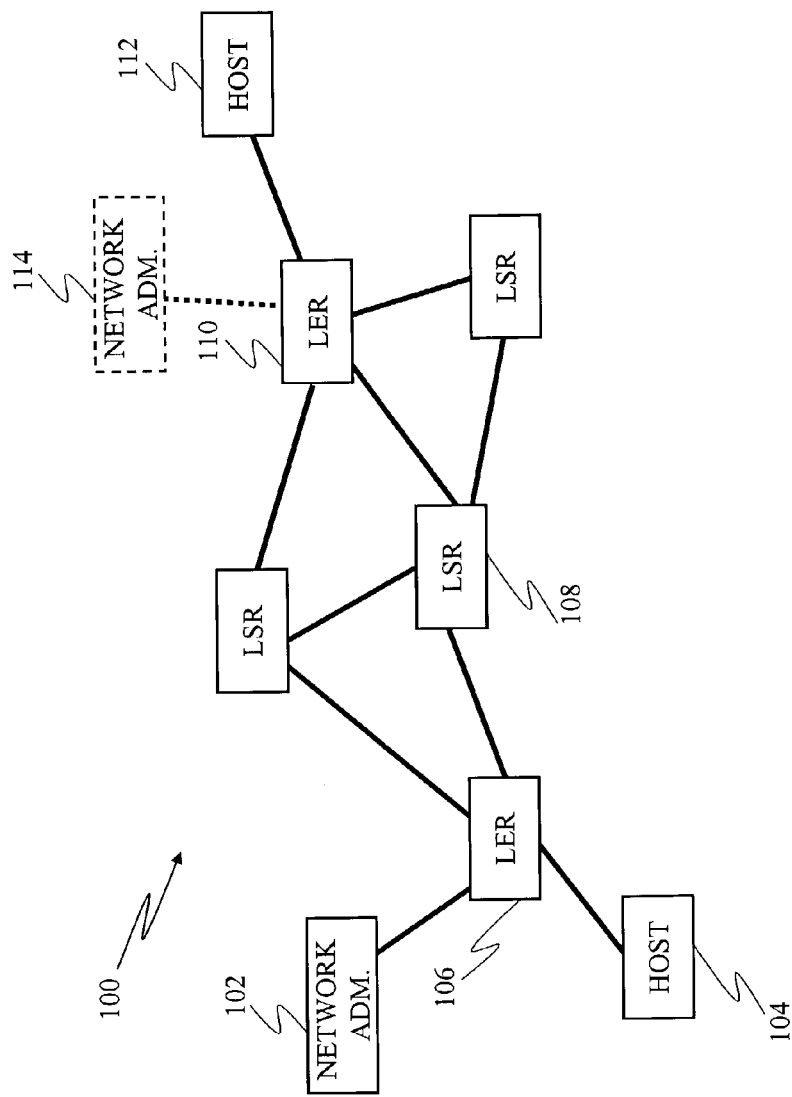
FIG. 1 is a network system including a plurality of routing devices operating MPLS protocol.

Referring to FIG. 1, an OSI layer 3 network with which the present invention may be implemented is illustrated. The network 100 is comprised of a plurality of routing devices and a plurality of hosts operatively coupled by means of wired, wireless, and/or optical connections. The network 100 is an IP network in the preferred embodiment, although one skilled in the art would recognize that the network may comprise or otherwise include any network capable of transporting MPLS packets or through which an LSP tunnel can be provisioned, including but not limited to asynchronous transfer mode (ATM) networks and Ethernet networks. At the periphery of the network is a first host 104 connected to the network 100 by means of a first edge router 106. The first edge router 106 is operated by a network administrator 102 that is either directly or indirectly linked to the first edge router 106 by means of a command line interface or network management tool, for example. The network 100 further includes a second host 112 connected to a second edge router 110 which is maintained by a second network administrator 114, for example. The first edge router 106 is operably coupled to the second edge router 110 either directly or indirectly by means of one or more transit routers, such as router 108. Each of the hosts 104, 112 may be a workstation, server, personal computer, local area network (LAN), or virtual LAN, for example.

The edge routers 106 and 110 and any transit routers through which label switched paths may be formed preferably support a multiprotocol label switching (MPLS) protocol and resource reservation protocol (RSVP). The term edge router is therefore synonymous with label edge router (LER), while the transit router is synonymous with label switched router (LSR). RSVP is set forth in the Internet Engineering Task Force (IETF) Request For Comment (RFC) 2205, entitled "Resource Reservation Protocol, Version 1, Functional Specification;" and IETF RFC 3209, entitled "RSVP-TE: Extensions to RSVP for LSP Tunnels," both of which are incorporated by reference herein. Using the standard protocols currently supported by RSVP, the first and second edge routers 106 and 110 of the example embodiment of the present invention are able to create and maintain a bi-directional layer 2 data tunnel to bring the first and second hosts 104 and 112 in direct communication.

Other related RSVP documents include IETF RFC 2210, entitled "The Use of RSVP with IETF Integrated Services;" IETF RFC 2211, entitled "Specification of the Controlled-Load Network Element Service;" IETF RFC 2215, entitled "General Characterization Parameters for Integrated Service Network Elements;" IETF RFC 2216, entitled "Network Element Service Specification Template;" IETF RFC 2747, entitled "RSVP Cryptographic Authentication," each of which is hereby incorporated by reference herein.

Figure 2:
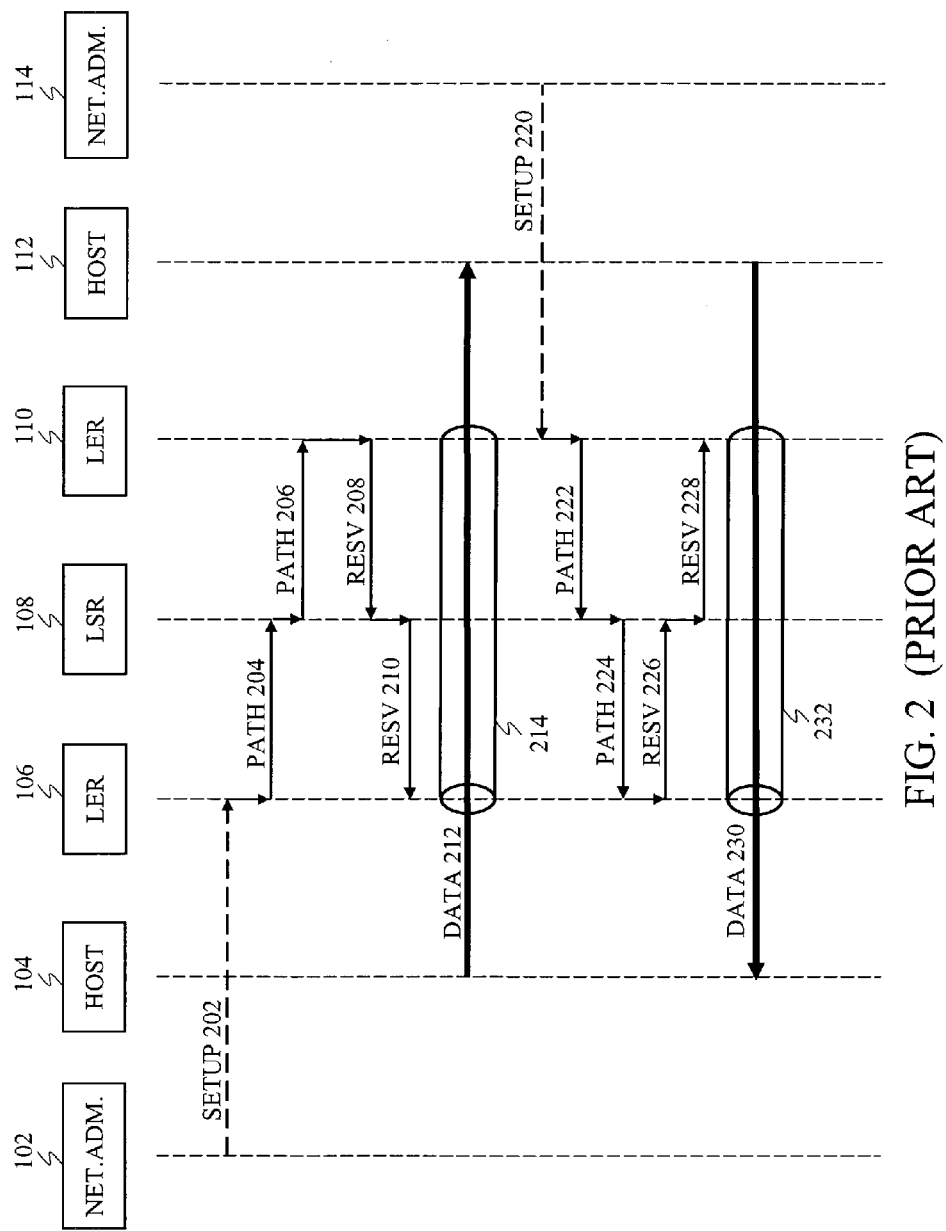
FIG. 2 is a flow diagram of the prior art method of establishing two unidirectional RSVP sessions between two edge routers.

Referring to FIG. 2, a flow diagram of the prior art method of establishing two unidirectional layer 2 tunnels, i.e. label switched paths, between two edge routers is illustrated. In the prior art, a first network administrator 102 managing a first LER 106 would input the information necessary to establish a first unidirectional tunnel for data transmitted from the first LER 106 to a second LER 110. The information provided to the first LER 106 is collectively represented in the SETUP signal 202 and may include the IP address of the second LER 110, the forwarding equivalency class (FEC) including one or more data streams and various quality of service (QoS) parameters including the desired LSP bandwidth. The first network administrator 102 may further specify the LSP path with one or more IP address of nodes through which the packet must travel while propagating to the egress node. In the case of the RSVP protocol, the first LER 106 then generates a PATH message 204 that hops from router to router until the message reaches the second LER 110. In response, the second LER 110 generates a RESV message 208 that causes the appropriate updates to be made to the forwarding tables of the transit routers en route to the first LER 106. Upon receipt, the first LER 106 then activates the first label switched path 214 through which unidirectional flows from the host 104 to the host 112.

In the prior art system, the formation of a second label switched path for tunneling a data stream in the direction opposite the first LSP must be set up separately at the second LER 110, likely by a second network administrator 114. The second administrator 114 enters the IP address of the first LER 106, FEC, and the QoS parameters to generate the PATH message 222, 224 before the second label switched path 232 could be established to support the return data flow 230. The second administrator 114 would need to acquire the required bandwidth and QoS, as well as the addresses of the transit routes in order to replicate the same propagation path as the first LSP 214. As can be seen, the procedure necessary to coordination the construction of two separate label switched paths by the two administrators is labor intensive and increases the likelihood of human error.

Figure 3:
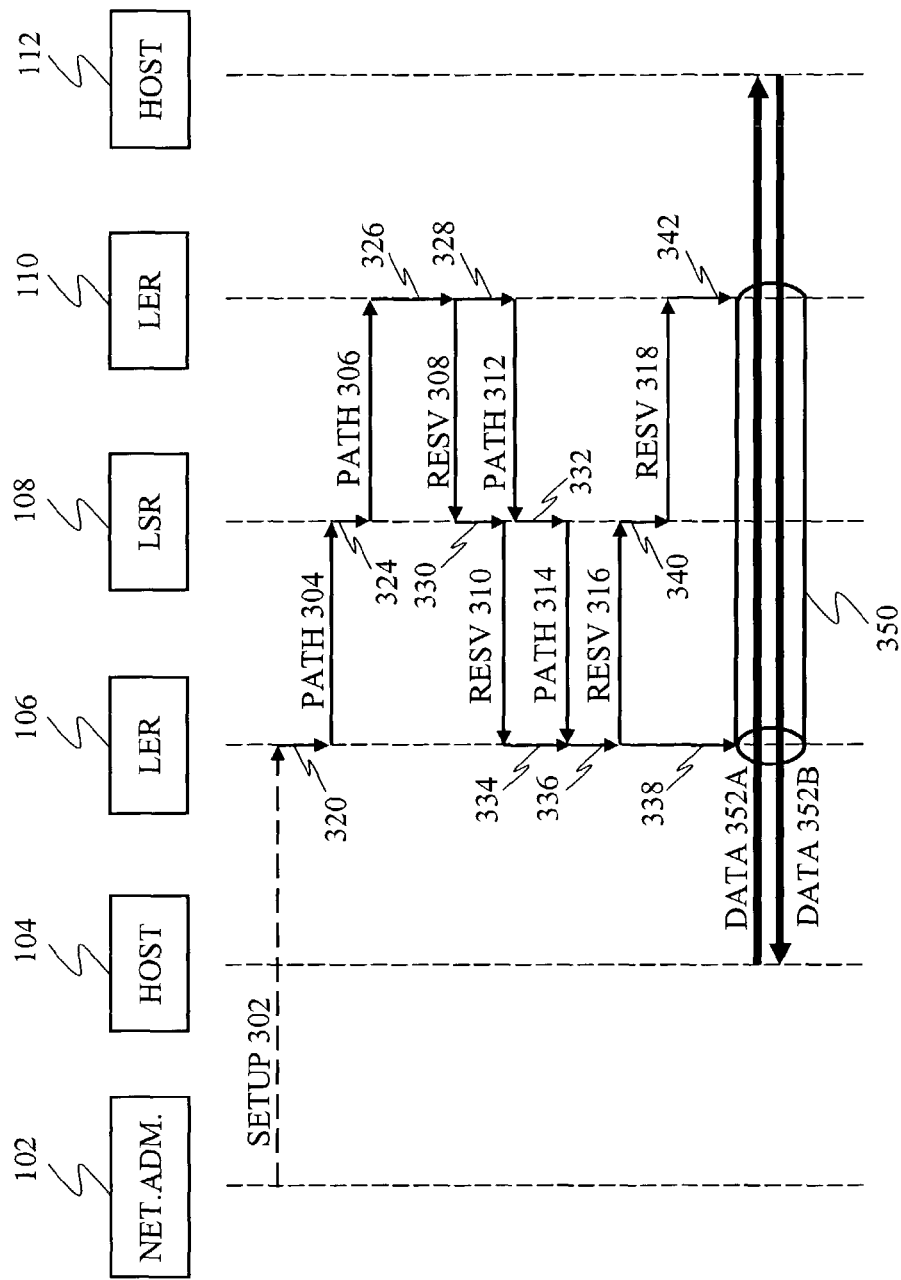
FIG. 3 is a flow diagram of the method of establishing a bi-directional RSVP session between two edge routers, according to the preferred embodiment of the present invention.

Referring to FIG. 3, a flow diagram of the method of establishing a bi-directional LSP between two edge routers according to the preferred embodiment is illustrated. The bi-directional tunnel of the present invention is in essence in this example a virtual circuit that couples both first host 104 and second host 112. The bi-directional tunnel is comprised of two unidirectional label switched paths that are associated with one another at the first edge router 106 and second edge router 110. For purposes of this application, two unidirectional label switched paths are referred to herein as the "forward LSP" for data originating at the LER 106 and the "return LSP" for data originating at the LER 110.

To establish a label switched path, the first network administrator 102 provides the initial LSP parameters to the first LER 106 as represented by SETUP signal 302. The SETUP signal 302 preferably includes the IP address of the tunnel endpoints, namely the first LER 106 and second LER 110, the forwarding equivalency class (FEC) identifying one or more data streams generated by the host 104, and one or more QoS parameters. Using the RSVP protocol, the administrator 104 may also input one or more intermediate LSRs to specify either a strict or loose explicit route object or contrained-LSP path object for data streams flowing from the first LER 106 to the second LER 110.

The SETUP signal 302 may further include additional parameters specific to the bandwidth and QoS for the return LSP, which may be different than that of the forward LSP. These parameters are sufficient to establish a forward LSP from the first LER 106 to the second LER 110 in accordance with the RSVP protocol defined in IETF RFC 3209, which is hereby incorporated by reference herein.

Figure 4:
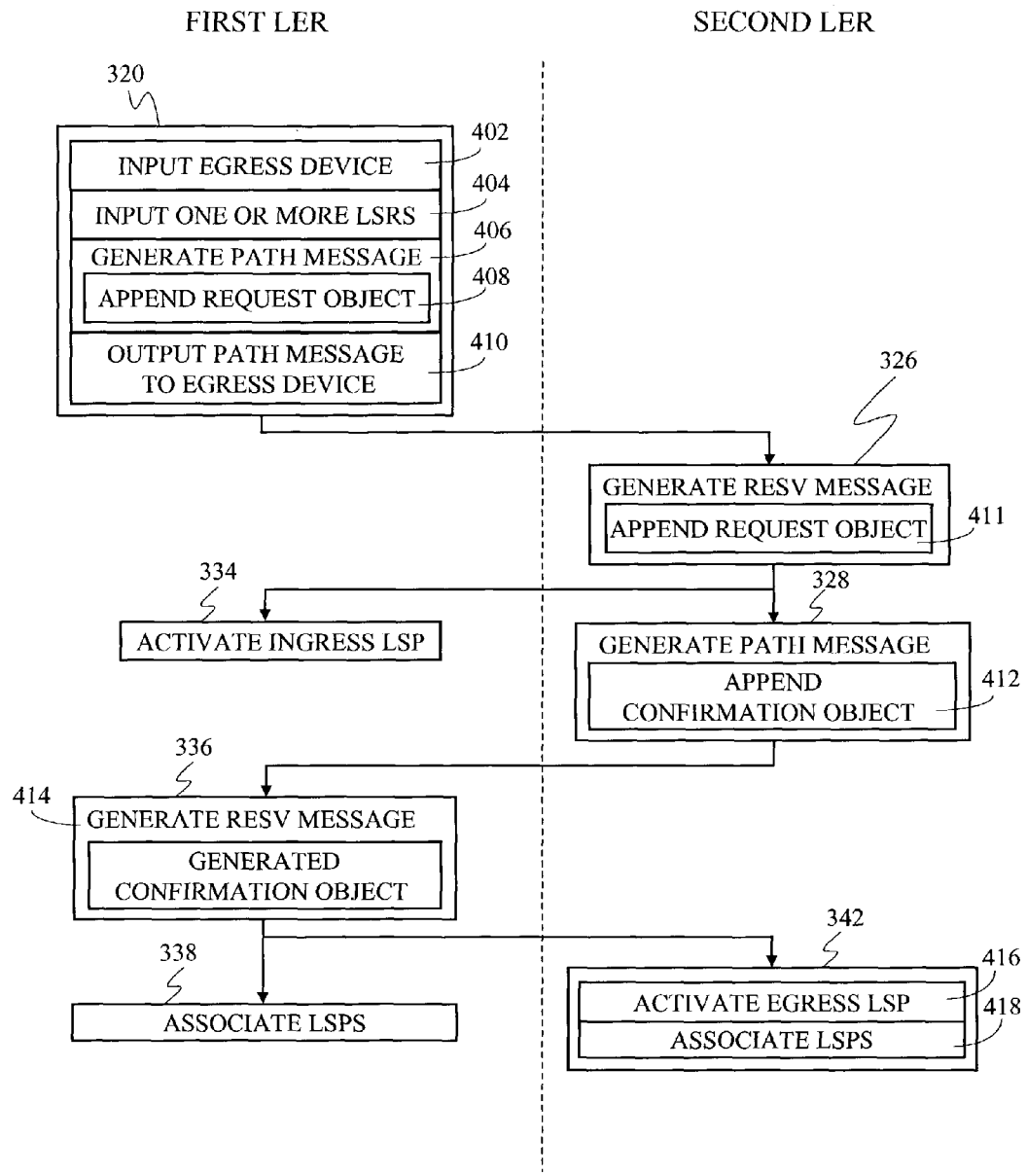
FIG. 4 is a flow chart of the method of creating a bi-directional tunnel between the first and second LERs, according to the preferred embodiment of the present invention.

The information of the SETUP signal 302 is used at the first LER 106 to generate a first LSP path message to establish a path state in the routers between the tunnel endpoints. In the preferred embodiment, the first LSP path message is a RSVP PATH message 304, as illustrated in a first step 320 of FIG. 4. The PATH message 304 defined in the RSVP protocol contains the bandwidth requirements for LSP, traffic characteristics, and addressing information including the source and destination IP addresses of the endpoints.

The PATH message 304 of the preferred embodiment further includes a record route object that causes the address of each of the transit routers through which PATH message propagates to be recorded in the message. The propagation path recorded therein may optionally be used to specify the path of the return LSP, as discussed in more detail below.

Figure 5A:
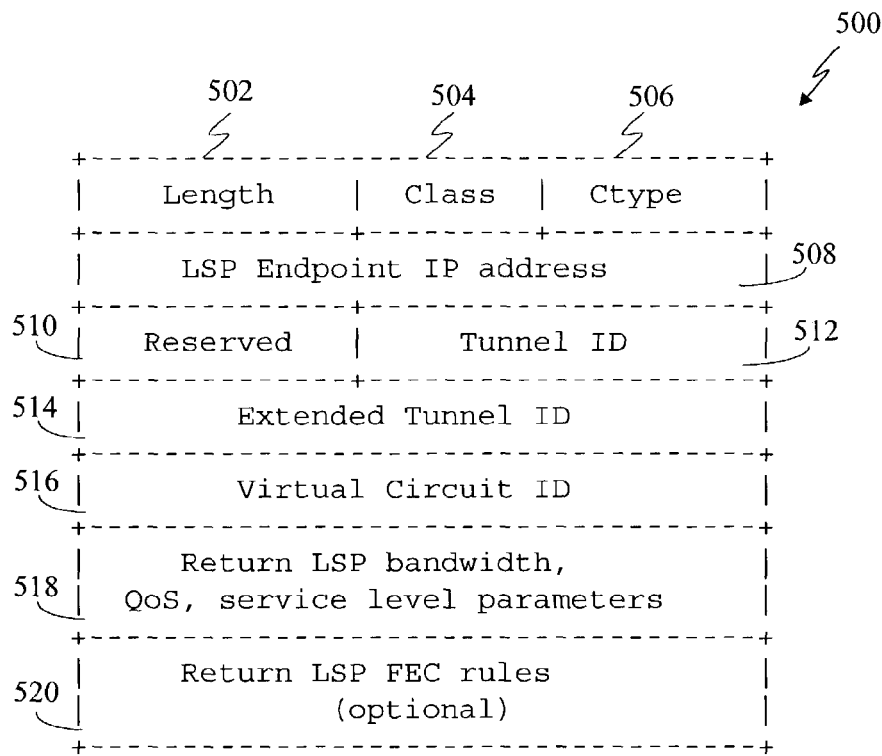
FIG. 5A is an opaque object included in an RSVP message for purposes of generating a return LSP according to the preferred embodiment of the present invention.

For purposes of creating the bi-directional LSP, the PATH message 304 of the preferred embodiment further includes a bi-directional indicator that causes the system of the present invention to initiate the return LSP in addition to the forward LSP. In the preferred embodiment, the bi-directional indicator for establishing the bi-directional tunnel is an opaque object, referred to herein as the "REQUEST object," that is generated in the first LER 106 and forwarded to the second LER 110. The REQUEST object 500 of the preferably embodiment, illustrated in FIG. 5, comprises a length field 502, Class field 504, Ctype field 506, LSP Endpoint IP address field 508, Reserved field 510, Tunnel ID field 512, 514, and Virtual circuit ID field 516.

In some embodiments, the purpose of the fields of the REQUEST object are as follows:
 a) Length field 502 used to specify the length of the entire object;
 b) Class field 504 is a number in the range 192 to 255, unique among the RSVP opaque objects, used to prompt the LER 110 to generated a return LSP according to the present invention;
 c) Ctype field 506 is preferably a number in which a '1' identifies the object as a REQUEST object while '2' identifies a CONFIRMATION object (described below) alternatively IPv6, ATM;
 d) LSP Endpoint IP address field 508 specifies the address of the engress router 110;
 e) optional Reserved field 510 used in this embodiment for byte alignment;
 f) Tunnel ID field 512 used in as part of the LSP's unique identifier;
 g) Extended Tunnel ID field 514 is by convention the IP address or port number of ingress router, LER 106, which is used in conjunction with Tunnel ID and LSP Endpoint IP address to uniquely identify the LSP;
 h) Virtual Circuit ID field 516 is number used to specify the virtual circuit that identifies two LSPs which, when associated with one another, form a bi-directional tunnel;
 i) optional Return Bandwidth field 518 used to specify the bandwidth and QoS requirements, as well as the service level agreement parameters for the return LSP if different than the forward LSP; and
 j) optional Return FEC rules field 520 used to define the criteria used by the LER 110 to classify traffic into the return LSP.

The optional Return Bandwidth field and Return FEC rules field are preferably used by LER 110 to generate the one or messages necessary to create the return LSP. Inclusion of one or more of the optional fields will therefore result in an "asynchronous" tunnel in the return direction. In the absence of these optional fields, the return LSP will symmetrically model the forward LSP.

The PATH message 304 including REQUEST object 500 is forwarded to the second LER 110 by way of network 100, which may include any number of transit routers, e.g. LSR 108. The transit router 108 tests for the availability of resources necessary to support the LSP. If available, the transit router 108 may make a tentative reservation to hold the necessary resources until a reservation message is received or the tentative reservation times out. The transit router 108 preferably makes a record of the LSP in the form of a data structure including identifying information such as the LER 110 Endpoint IP address, the tunnel ID, and the extended tunnel ID. Before the transit router 108 forwards the PATH message 304, it may record its IP address in the record route object, if present. On the other hand, if the resources necessary to support a forward LSP are not available, the PATH message 304 is terminated and an error message returned to LER 106.

In response to receipt of the first LSP setup request message, second LER 110 preferably generates a first LSP reservation message. The reservation message is in the preferred embodiment a RSVP RESV message 308, which is illustrated in step 326. The RESV message 308 generally includes the same traffic flow information as the PATH message, with the notable exception of a unique MPLS label to be distributed to the upstream LSR. One skilled in the art will recognize that the REQUEST object 500 may optionally be included in the RSVP RESERVATION message 308 in order to facilitate the association of the forward and return LSPs in the transit routers.

The treatment of the RESV message 308 in the preferred embodiment is consistent with that prescribed in the RSVP standard. The RESV message 308 is forwarded towards the LER 106 along the same route of the first LSP path message. Upon receipt, the transit router 108 looks into the message 308 to determine if it has sufficient available resources to provide the bandwidth and QOS requested in the previous PATH message 304 for the forward LSP. If available, the transit router 108 updates its MPLS forwarding table with the MPLS label from the LER 110 and outgoing port number included in the RESV message 308. If the check fails for lack of available resources, for example, transit router 108 returns an error notification to the LER 110 that made the initial request.

The transit router 108 also generates a MPLS label unique in its label space that is encapsulated in the RESV message 310. Packets subsequently received with the proper label are then prioritized, queued, and switched to the next hop according to the QOS and service level parameters provided in the PATH message 305. The process by which the RESV message is forwarded to the next hop is repeated for node in the return data path between the LER 110 and LER 106.

In addition to the RESV message 308, the second LER 110 also generates a second LSP setup request message, preferably a PATH message, at the second LER 110 to establish a second LSP for data flow in the direction of the first LER 106. In particular, the second LER 110 automatically responds to the REQUEST object 500 embedded in the PATH message 306 with its own PATH message 312, which is generated in step 328 of FIGS. 3 and 4. In some embodiments, the PATH message 312 includes an explicit route object that is derived from the path vector of the forward PATH message 306. This path vector, which contains a list of the LSRs that the first LSP request message traversed, can be used to specify the identical path for the second LSP request message. In this manner, the two unidirectional LSPs will traverse a common propagation, thereby minimizing the change of the bi-directional LSP failing.

One skilled in the art will recognize that the first LSP reservation message of step 326 and second LSP request message 328 may occur in either order or contemporaneously.

In this embodiment, the second LSP request message 312 further includes a second bi-directional indicator that causes the system of the present invention to complete the construction of the return LSP and the bi-directional tunnel more generally. The second bi-directional indicator is an opaque object referred to herein as the CONFIRMATION object.

Figure 5B:
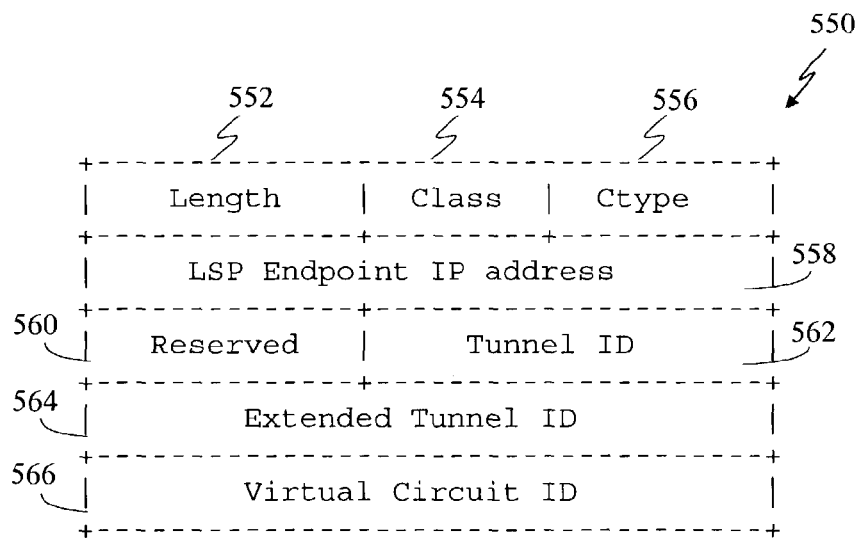
FIG. 5B is an opaque object included in an RSVP message for purposes of completing a return LSP according to the preferred embodiment of the present invention.

In some embodiments, the purpose of the fields of the CONFIRMATION object 550 illustrated in FIG. 5B are as follows:
 a) Length field 552 specifies the length of the entire object;
 b) Class field 554 is a number in the range 192 to 255, unique among the RSVP opaque objects, used to identify the return LSP PATH message;
 c) Ctype field 556 is preferably a number in which '2' identifies a CONFIRMATION object;
 d) LSP Endpoint IP address field 558 specifies the address of the igress router 106;
 e) optional Reserved field 560 used in this embodiment for byte alignment;
 f) Tunnel ID field 562 used in as part of the LSP's unique identifier;
 g) Extended Tunnel ID field 564 is by convention the IP address or port number of egress router, LER 110, which is used in conjunction with Tunnel ID and LSP Endpoint IP address to uniquely identify the LSP; and
 h) Virtual Circuit ID field 566 is number used to specify the virtual circuit that identifies two LSPs which, when associated with one another, form a bi-directional tunnel.

Various fields of the CONFIRMATION object 550 are reproduced from the REQUEST object 500. In these include the Tunnel ID field 562, Extended Tunnel ID field 564, Virtual Circuit ID field 566, and LSP Endpoint ID address 558.

The PATH message 312 generated by the second LER 110 with the CONFIRMATION object 550 then includes all the information necessary to construct the return LSP in the opposite direction of the forward LSP. Because the return LSP specifications represented in the CONFIRMATION object 550 and PATH message 312 more generally were set forth in there entirely in the PATH message 306, the first network administrator 102 has the power to create the return LSP of any desired character and duration, subject to any resource and security limitations imposed at the second LER 110 or transit routers.

The PATH message 312 is then forwarded to the transit router 108 for transmission to the first LER 106. As before, the transit router 108 preferably makes a record of return LSP identifying information including the first LER 106 Endpoint IP address, the tunnel ID, and the extended tunnel ID. In some embodiments, the REQUEST object 500 of the PATH message 304 and the CONFIRMATION object 550 of the PATH message 312 may be used to recognize the two unidirectional LSPs. If properly tracked by the transit router 108, the two unidirectional LSPs may be associated at the transit router 108, after which the router 108 may deconstruct, reconstruct, or re-route the two LSPs together instead of treating each independently.

The first LER 106 receives the RESV message 310 and the PATH message 314. In response to the RESV message 310, the first LER 106 activates the first uni-directional LSP for transmitting data 352A by means of tunnel from the first LER 106 to the second LER 110. This step 334 is illustrated in both FIGS. 3 and 4. In response to the PATH message 314, the first LER 106 generates in step 336 a second LSP reservation message to establish a path state in the transit routers between the endpoints for data flowing from the second LER 110 to the first LER 106. In the preferred embodiment, the second LSP reservation message is a RSVP RESV message 316 that is returned to the second LER 110 by an intermediate LSR 108. Upon receipt of the RESV message 318, the second LER 110 activates the second uni-directional LSP for transmitting data 352B by means of a tunnel from the second LER 110 to the first LER 106.

In some embodiments, the process of forming the bi-directional LSPs is completed when the two uni-directional tunnels are associated with one another at the endpoints. In particular, first LER 106 associates return LSP with the forward LSP, as illustrated in step 338. At the second LER 110, the return LSP is activated 416 and associated 418 with the forward LSP, these steps collectively referred to as step 342 and illustrated in both FIGS. 3 and 4. The association of forward and return LSPs constitutes what is referred to herein as a logical bi-directional tunnel that supports label switched traffic between the host 102 and the host 112.

With the bi-directional LSP complete, data is transmitted through the tunnel in the manner conventionally prescribed by the MPLS protocol. The present embodiment of the invention does not alter the implementation of virtual circuits in the "data plane." As such, the data 352A generated at the first host 104 is transmitted to the first LER 106 where the packet classifier identifies the packet as a member of a particular forwarding equivalency class. The first LER 106 encapsulates the packet with an MPLS header including a label, and then forwards the labeled packet to the transit router 108.

The transit router 108 uses the label as an index into its MPLS forwarding table, and retrieves an outbound label that is appended to the packet. The transit router 108 also commits the resources necessary to support the forward LSP. In particular, the packet classifier and packet scheduler are then configured so that packets of the FEC are prioritized, queued, and switched to the next hop according to the QoS and service level parameters provided in the PATH message. Transit routers may perform additional processing, including decrementing the time to live value and performing checksum, for example. The MPLS header is preferably removed by the second LER 110, or early using penultimate hop, and the packet forwarded to the second host 112 using the standard routing protocols. The transfer of data from the second LER 110 to the first LER 106 occurs in an analogous manner.

After each of the unidirectional LSPs is formed, one or more additional "tunnels" may be established within the LSPs. LDP, for example, may be used to form these inner or embedded tunnels sometimes referred to as "pseudo wires." The pseudo wires effectively subdivided the tunnel into additional flows identified by unique labels without the need for separate LSP path and LSP reservation messages. A Transmission Control Protocol (TCP) connection between endpoints, defined by label, LSP tunnel and FEC, is established. One skilled in the art will recognize that pairs of pseudo wires may also be associated with one another at the endpoints to create bi-direction LDP tunnels.

The first LER 106 and the second LER 110 preferably send periodic refresh messages to maintain the LSPs. In the absence of refresh messages at a regular refresh interval, the forward LSP and return LSP will automatically terminate and the corresponding entry in the MPSL forwarding table of the edge and transit routers deleted. The forward and return LSPs may also be removed using path and reservation teardown messages, both of which are defined in the RSVP standard.

One skilled in the art will recognize that measures may be implemented at one or more routers to minimize the potential for unauthorized use the router resources. Security measures may include authorization codes and or criteria, for example, used to prevent any party from outside a network administrator-defined group of computers to create a return LSP, or prevent a party from reserving bandwidth in excess of some threshold. The authorization codes and/or criteria may be embedded in an opaque object, in a LSP path message, a separate MPLS message, or manual methods that may involve one or more network administrators.

The systems and methods of the present invention may be implemented in software running in connection with a programmable microprocessor; implemented in hardware utilizing either a combination of microprocessors or other specially designed application specific integrated circuits and programmable logic devices; or various combinations thereof. Thus, embodiments of the invention are not limited to any specific combination of hardware circuitry and software.

In some embodiments, the methods of the present invention is performed by one or more routing devices executing sequences of instructions retained in memory at the routing devices or in another computer-readable medium. The term "computer-readable medium" as used herein refers to any medium that participates in providing instructions to one more processors for execution. Such a medium may take many forms, including but not limited to, non-volatile media and volatile media. Non-volatile media includes, for example, hard disks, optical or magnetic disks, floppy disks, magnetic tape, or any other magnetic medium, CD-ROMs and other optical media.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A method of forming a bi-directional label switched path (LSP) between a first routing device and second routing device, the method comprising the steps of:
   (a) sending a first LSP setup request message comprising a first bi-directional indicator from the first routing device to the second routing device, wherein sending the first LSP setup request message causes a message exchange initiated by the first LSP setup request message to establish a first unidirectional label switched path from the first routing device to the second routing device, wherein the first LSP setup request message is a first RSVP PATH message including a Record Route Object and wherein sending the first LSP setup request message includes causing an address of each transit routing device through which the first RSVP PATH message propagates between the first routing device to the second routing device to be recorded within the Record Route object as the first RSVP PATH message propagates between the first routing device to the second routing device;
   (b) automatically sending a second LSP setup request message from the second routing device to the first routing device in response to the first bi-directional indicator, wherein sending the second LSP setup request message causes a message exchange initiated by the second LSP setup request message to establish a second unidirectional label switched path from the second routing device to the first routing device, wherein sending the second LSP setup request message includes sending the second LSP setup request message over a path that the first LSP setup request message was sent such that the second unidirectional label switched path propagates over the path of the first unidirectional label switched path in an opposite direction as the first unidirectional label switched path, wherein sending the second LSP setup request message over the path that the first LSP setup request message was sent includes accessing the address of each transit routing device through which the first LSP setup request message propagated between the first routing device to the second routing device from the Record Route Object and causing the second LSP setup message to propagate through each transit routing device through which the first LSP setup request message propagated such that the second unidirectional label switched path propagates over the same path as the first unidirectional label switched path during an entire duration of time that the bi-directional LSP is established; and
   (c) said routing devices between which said first and second unidirectional LSPs are formed periodically sending refresh messages between each other to maintain said first and second unidirectional LSPs through creation and utilization of information provided by the Record Route Object thereby ensuring that said first and second unidirectional LSPs continue to traverse a common path during the entire duration of time that the bi-directional LSP is established.

2. The method of claim 1, wherein sending the second LSP setup request message over the path that the first LSP setup request message was sent includes sending the second LSP setup request message in accordance with a route object derived from a path vector associated with the path of the first LSP setup request message.

3. The method of claim 1, wherein the first bi-directional indicator is an opaque object embedded in the first LSP setup request message.

4. The method of claim 1, wherein the second LSP setup request message is a second RSVP PATH message.

5. The method of claim 1, wherein:
   the second LSP setup request message comprises a second bi-directional indicator;
   the first bi-directional indicator uniquely identifies the first unidirectional label switched path and specifies resource requirements of the second unidirectional label switched path; and
   the second bi-directional indicator is configured for indicating to the first routing device that the second unidirectional label switched path is to be associated at path endpoints defined by said first and second unidirectional label switched paths.

6. The method of claim 2, wherein the method further comprises the step of creating one or more inner label switched paths within the first and second unidirectional label switched paths.

7. The method of claim 6, wherein the one or more inner label switched paths are pseudo wires generated using label distribution protocol.

8. The method of claim 3, wherein the opaque object is comprised of a label switched path endpoint identification field, a tunnel identification field, and an extended tunnel identification field.

9. The method of claim 8, wherein the opaque object further comprises a length field, a class field, a ctype field, and a virtual circuit identification field.

10. The method of claim 8, wherein the opaque object further comprises a return label switched path bandwidth field and a return label switched path quality of service field.

11. The method of claim 5, wherein the method further includes the step of sending a first RSVP RESV message from the second routing device to the first routing device upon receipt of the first RSVP PATH message.

12. The method of claim 11, wherein the method further includes the step of sending a second RSVP RESV message from the first routing device to the second routing device upon receipt of the second RSVP PATH message.

13. The method of claim 5, wherein the first RSVP PATH message propagates between the first routing device and second routing device according to a first explicit route object.

14. The method of claim 13, wherein the second RSVP PATH message propagates between the first routing device and second routing device according to a second explicit route object that is derived from a path vector of the first RSVP PATH message and wherein the path vector is derived using the address of each transit routing device accessed from the Record Route Object.

15. The method of claim 5, wherein the method further includes the step of associating the first unidirectional label switched path and the second unidirectional label switched path at the first routing device and second routing device, wherein said associating is performed in response to the first routing device receiving the second bi-directional indicator.

16. A system for establishing a bi-directional label switched path (LSP) between endpoints, the system comprising:
(a) a first routing device for sending a first LSP setup request message from the first routing device; and
(b) a second routing device for automatically sending a second LSP setup request message from the second routing device to the first routing device upon receipt of the first LSP setup request message;
wherein the first LSP setup request message comprises a first bi-directional indicator; wherein, between the first routing device and the second routing device, a first unidirectional label switched path and a second unidirectional label switched path are established in response to respective first and second message exchanges initiated by the first and second LSP setup request messages, respectively;
wherein the first LSP setup request message is a first RSVP PATH message including a Record Route Object;
wherein sending the first LSP setup request message includes causing an address of each transit routing device through which the first RSVP PATH message propagates between the first routing device to the second routing device to be recorded within the Record Route object as the first RSVP PATH message propagates between the first routing device to the second routing device;
wherein sending the second LSP setup request message includes sending the second LSP setup request message over a path that the first LSP setup request message was sent such that the second unidirectional label switched path propagates over the path of the first unidirectional label switched path during an entire duration of time that the bi-directional LSP is established; and
wherein sending the second LSP setup request message over the path that the first LSP setup request message was sent includes accessing the address of each transit routing device through which the first LSP setup request message propagated between the first routing device to the second routing device from the Record Route Object and causing the second LSP setup message to propagate through each transit routing device through which the first LSP setup request message propagated such that the second unidirectional label switched path propagates over the same path as the first unidirectional label switched path; whereby label encapsulated data are transmitted bi-directionally between the first routing device and the second routing device over the same path; and
wherein said routing devices between which said first and second unidirectional LSPs are formed periodically sending refresh messages between each other to maintain said first and second unidirectional LSPs through creation and utilization of information provided by the Record Route Object thereby ensuring that said first and second unidirectional LSPs continue to traverse a common path during the entire duration of time that the bi-directional LSP is established.

17. The system of claim 16, wherein the second LSP setup request message is automatically sent in response to an opaque object embedded in the first LSP setup request message.

18. The system of claim 16, wherein the second LSP setup request message is a second RSVP PATH message.

19. The system of claim 16, wherein:
the second LSP setup request message comprises a second bi-directional indicator in the form of an opaque object;
the first bi-directional indicator uniquely identifies the first unidirectional label switched path and specifies resource requirements of the second unidirectional label switched path; and
the second bi-directional indicator is configured for indicating to the first routing device that the second unidirectional label switched path is to be associated at path endpoints defined by said first and second unidirectional label switched paths.

20. The system of claim 18, wherein the second routing device includes means for sending a first RSVP RESV message to the first routing device upon receipt of the first RSVP PATH message.

21. The system of claim 18, wherein the first routing device further comprises means for sending a second RSVP RESV message to the second routing device upon receipt of the second RSVP PATH message.

22. The system of claim 19, wherein between the first routing device and the second routing device the first unidirectional label switched path and the second unidirectional label switched path are associated at the first routing device and second routing device; whereby the first routing device and the second routing device are coupled via a virtual circuit and, wherein said associating is performed in response to the first routing device receiving the second bi-directional indicator.

23. A non-transitory computer-readable medium containing computer-executable instructions for controlling at least one routing device to perform a method of forming a bi-directional label switched path (LSP) between a first routing device and second routing device, the method comprising the steps of:

(a) sending a first LSP setup request message comprising a first bi-directional indicator from the first routing device to the second routing device, wherein sending the first LSP setup request message causes a message exchange initiated by the first LSP setup request message to establish a first unidirectional label switched path from the first routing device to the second routing device, wherein the first LSP setup request message is a first RSVP PATH message including a Record Route Object, wherein sending the first LSP setup request message includes causing an address of each transit routing device through which the first RSVP PATH message propagates between the first routing device to the second routing device to be recorded within the Record Route object as the first RSVP PATH message propagates between the first routing device to the second routing device;

(b) automatically sending a second LSP setup request message from the second routing device to the first routing device wherein sending the second LSP setup request message causes a message exchange initiated by the second LSP setup request message to establish a second unidirectional label switched path from the second routing device to the first routing device, wherein sending the second LSP setup request message includes sending the second LSP setup request message over a path that the first LSP setup request message was sent such that the second unidirectional label switched path propagates over the path of the first unidirectional label switched path in an opposite direction as the first unidirectional label switched path, and wherein sending the second LSP setup request message over the path that the first LSP setup request message was sent includes accessing the address of each transit routing device through which the first LSP setup request message propagated between the first routing device to the second routing device from the Record Route Object and causing the second LSP setup message to propagate through each transit routing device through which the first LSP setup request message propagated such that the second unidirectional label switched path propagates over the same path as the first unidirectional label switched path during an entire duration of time that the bi-directional LSP is established; and (c) said routing devices between which said first and second unidirectional LSPs are formed periodically sending refresh messages between each other to maintain said first and second LSPs through creation and utilization of information provided by the Record Route Object thereby ensuring that said first and second unidirectional LSPs continue to traverse a common path during the entire duration of time that the bi-directional LSP is established.

24. The non-transitory computer-readable medium of claim 23, wherein the first bi-directional indicator is an opaque object embedded in the first LSP setup request message.

25. The non-transitory computer-readable medium of claim 23, wherein the second LSP setup request message is a second RSVP PATH message.

26. The non-transitory computer-readable medium of claim 23, wherein:
the second LSP setup request message comprises a second bi-directional indicator in the form of an opaque object;
the first bi-directional indicator uniquely identifies the first unidirectional label switched path and specifies resource requirements of the second unidirectional label switched path; and
the second bi-directional indicator is configured for indicating to the first routing device that the second unidirectional label switched path is to be associated at path endpoints defined by said first and second unidirectional label switched paths.

27. A method of forming a bi-directional label switched path (LSP) between a first routing device and second routing device, the method comprising the steps of:

(a) sending a first LSP setup request message from the first routing device to the second routing device, wherein sending the first LSP setup request message causes a message exchange initiated by the first LSP setup request message to establish a first unidirectional label switched path from the first routing device to the second routing device, wherein the first LSP setup request message is a first RSVP PATH message including a Record Route Object, wherein sending the first LSP setup request message includes causing an address of each transit routing device through which the first RSVP PATH message propagates between the first routing device to the second routing device to be recorded within the Record Route object as the first RSVP PATH message propagates between the first routing device to the second routing device;

(b) sending a second LSP setup request message from the second routing device to the first routing device whenever the first LSP setup request message of the first LSP setup request message comprises a bi-directional indicator, wherein sending the second LSP setup request message causes a message exchange initiated by the second LSP setup request message to establish a second unidirectional label switched path from the second routing device to the first routing device, wherein sending the second LSP setup request message includes sending the second LSP setup request message over a path that the first LSP setup request message was sent such that the second unidirectional label switched path propagates over the path of the first unidirectional label switched path during an entire duration of time that the bi-directional LSP is established, and wherein sending the second LSP setup request message over the path that the first LSP setup request message was sent includes accessing the address of each transit routing device through which the first LSP setup request message propagated between the first routing device to the second routing device from the Record Route Object and causing the second LSP setup message to propagate through each transit routing device through which the first LSP setup request message propagated such that the second unidirectional label switched path propagates over the same path as the first unidirectional label switched path; and (c) said routing devices between which said first and second unidirectional LSPs are formed periodically sending refresh messages between each other to maintain said first and second unidirectional LSPs through creation and utilization of information provided by the Record Route Object thereby ensuring that said first and second unidirectional LSPs continue to traverse a common path during the entire duration of time that the bi-directional LSP is established.

28. The method of claim 27, wherein sending the second LSP setup request message over the path that the first LSP setup request message was sent includes sending the second LSP setup request message in accordance with a route object derived from a path vector associated with the path of the first LSP setup request message and wherein the path vector is derived using the address of each transit routing device accessed from the Record Route Object.

* * * * *